United States Patent
Lee et al.

(10) Patent No.: US 11,391,984 B2
(45) Date of Patent: Jul. 19, 2022

(54) POLARIZING PLATE, IMAGE DISPLAY APPARATUS COMPRISING SAME, AND ADHESIVE COMPOSITION FOR POLARIZING PLATE

(71) Applicant: LG Chem, Ltd., Seoul (KR)

(72) Inventors: Mi So Lee, Daejeon (KR); Jin Woo Kim, Daejeon (KR); Dong Uk Kim, Daejeon (KR); Yoonkyung Kwon, Daejeon (KR)

(73) Assignee: Shanjin Optoelectronics (Suzhou) Co., Ltd.

( * ) Notice: Subject to any disclaimer, the term of this patent is extended or adjusted under 35 U.S.C. 154(b) by 0 days.

(21) Appl. No.: 16/958,981

(22) PCT Filed: May 21, 2019

(86) PCT No.: PCT/KR2019/006076
§ 371 (c)(1),
(2) Date: Jun. 29, 2020

(87) PCT Pub. No.: WO2019/225949
PCT Pub. Date: Nov. 28, 2019

(65) Prior Publication Data
US 2020/0341331 A1    Oct. 29, 2020

(30) Foreign Application Priority Data
May 21, 2018   (KR) .................. 10-2018-0057829

(51) Int. Cl.
*C09J 163/00*   (2006.01)
*G02F 1/1335*   (2006.01)
(Continued)

(52) U.S. Cl.
CPC ........ *G02F 1/133528* (2013.01); *C09J 7/201* (2018.01); *C09J 163/00* (2013.01);
(Continued)

(58) Field of Classification Search
CPC ....... G02F 1/133528; G02B 5/30; G02B 1/04; C09J 7/20; C09J 163/00; C09J 2301/312;
(Continued)

(56) References Cited

U.S. PATENT DOCUMENTS 9,056,941 B2   6/2015   Higo et al.
2011/0043733 A1   2/2011   Suzuki et al.
(Continued)

FOREIGN PATENT DOCUMENTS

EP   3671296 A1   6/2020
JP   2011028234 A   2/2011
(Continued)

OTHER PUBLICATIONS

International Search Report for Application No. PCT/KR2019/006076 dated Aug. 21, 2019, 4 pages.
(Continued)

*Primary Examiner* — Ruiyun Zhang

(57) ABSTRACT

The present specification relates to a polarizing plate comprising a polarizer; a protective layer directly formed on one surface of the polarizer; and an adhesive layer and a protective film consecutively provided on a surface of the polarizer on which the protective layer is not formed, wherein the adhesive layer is a resin layer comprising an active energy ray-curable composition comprising a first epoxy compound (A) comprising one or more alicyclic epoxy rings, and, with respect to 100 parts by weight of the first epoxy compound (A), a second epoxy compound (B) comprising one or more glycidyl ether groups in 110 parts by weight to 500 parts by weight and an oxetane compound (C) in 5 parts by weight to 85 parts by weight, or a cured material thereof, an image display device comprising the same, and an adhesive composition for a polarizing plate.

13 Claims, 1 Drawing Sheet

(51) Int. Cl.
*G02B 1/14* (2015.01)
*C09J 7/20* (2018.01)
*G02B 5/30* (2006.01)
*G02B 1/04* (2006.01)

(52) U.S. Cl.
CPC ................ *G02B 1/14* (2015.01); *G02B 5/30* (2013.01); *C09J 2203/318* (2013.01); *C09J 2301/312* (2020.08); *C09K 2323/031* (2020.08); *C09K 2323/05* (2020.08); *C09K 2323/055* (2020.08); *G02B 1/04* (2013.01); *G02F 2202/023* (2013.01); *G02F 2202/28* (2013.01)

(58) Field of Classification Search
CPC ......... C09J 2203/318; C09K 2323/031; C09K 2323/05; C09K 2323/055
USPC .................... 428/1.1, 1.31, 1.5, 1.53; 349/96
See application file for complete search history.

(56) References Cited

U.S. PATENT DOCUMENTS

| | | | |
|---|---|---|---|
| 2012/0257128 A1 | 10/2012 | Seo et al. | |
| 2014/0072731 A1 | 3/2014 | Seo et al. | |
| 2015/0062503 A1 | 3/2015 | Yoon et al. | |
| 2016/0238767 A1 | 8/2016 | Park et al. | |
| 2018/0112050 A1 | 4/2018 | Lim et al. | |
| 2020/0201089 A1* | 6/2020 | Lee | G02B 5/30 |

FOREIGN PATENT DOCUMENTS

| | | | |
|---|---|---|---|
| JP | 2011132487 A | | 7/2011 |
| JP | 2015137326 A | | 7/2015 |
| JP | 2016505871 A | | 2/2016 |
| JP | 2017075986 A | | 4/2017 |
| KR | 20120050399 A | | 5/2012 |
| KR | 20130040725 A | | 4/2013 |
| KR | 20150037555 A | | 4/2015 |
| KR | 101673037 B1 | | 11/2016 |
| KR | 20160142546 A | | 12/2016 |
| KR | 20170092928 A | | 8/2017 |
| KR | 20180013429 A | | 2/2018 |
| KR | 20180050120 A | * | 5/2018 |
| KR | 20180050120 A | | 5/2018 |
| WO | WO-2019059692 A1 | * | 3/2019 ........... G02B 5/3025 |

OTHER PUBLICATIONS

Extended European Search Report for Application No. 19808302.4 dated Mar. 2, 2021, pp. 1-2.

* cited by examiner

[FIG. 1]
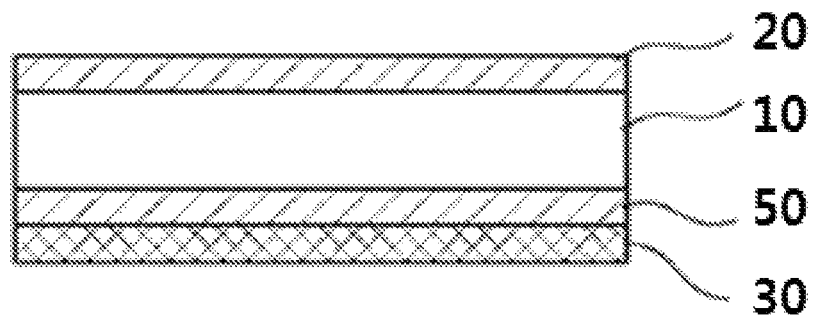
[FIG. 2]
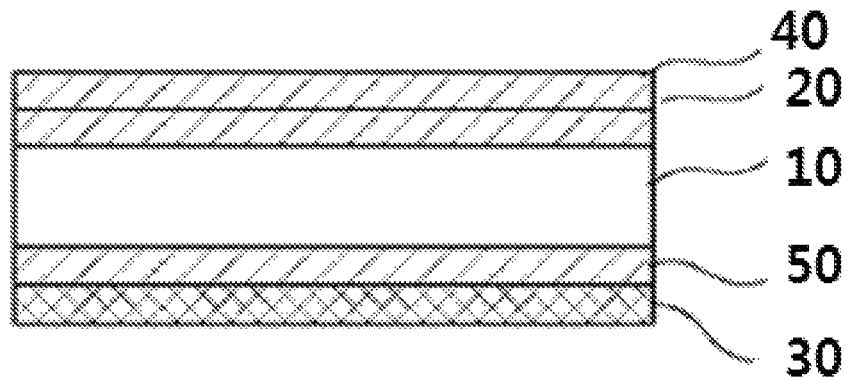
[FIG. 3]
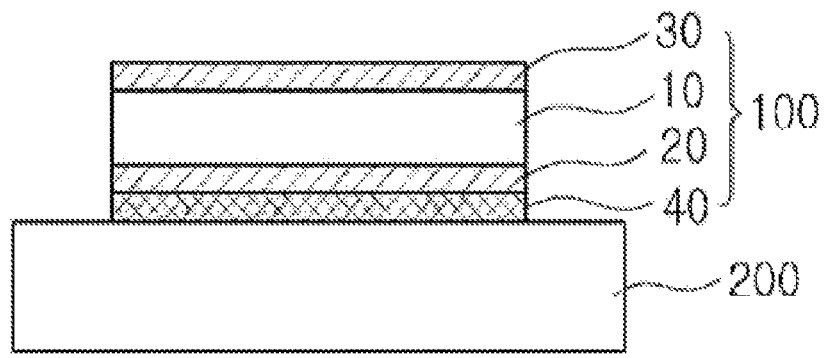

POLARIZING PLATE, IMAGE DISPLAY APPARATUS COMPRISING SAME, AND ADHESIVE COMPOSITION FOR POLARIZING PLATE

CROSS-REFERENCE TO RELATED APPLICATIONS

The present application is a national phase entry under 35 U.S.C. § 371 of International Application No. PCT/KR2019/006076 filed May 21, 2019, which claims priority from Korean Patent Application No. 10-2018-0057829, filed with the Korean Intellectual Property Office on May 21, 2018, the entire contents of which are incorporated herein by reference.

TECHNICAL FIELD

The present specification relates to a polarizing plate, an image display device comprising the same, and an adhesive composition for a polarizing plate.

BACKGROUND ART

Existing polarizing plates for a liquid crystal display device use a general polyvinyl alcohol-based polarizer, and have a constitution of attaching a protective film such as TAC on at least one side surface of the polarizer.

In a recent polarizing plate market, demands for low light leakage and thinning have increased, and in order to satisfy these properties, a method of directly forming a protective film on a polarizer has been examined instead of using an existing protective substrate formed as a film in advance.

However, when directly forming a protective film on an existing polyvinyl alcohol-based elongation-type polyvinyl alcohol-based polarizer, a problem of the polarizer being torn by stress generated from polarizer shrinkage at a high temperature has been difficult to resolve compared to when using a protective substrate on both surfaces as in the art.

PRIOR ART DOCUMENTS

Patent Documents

Korean Patent No. 10-1673037

DISCLOSURE

Technical Problem

The present specification is directed to providing a polarizing plate, an image display device comprising the same, and an adhesive composition for a polarizing plate.

Technical Solution

One embodiment of the present specification provides a polarizing plate comprising a polarizer; a protective layer directly formed on one surface of the polarizer; and an adhesive layer and a protective film consecutively provided on a surface of the polarizer on which the protective layer is not formed, wherein the adhesive layer is a resin layer comprising an active energy ray-curable composition comprising a first epoxy compound (A) comprising one or more alicyclic epoxy rings, and, with respect to 100 parts by weight of the first epoxy compound (A), a second epoxy compound (B) comprising one or more glycidyl ether groups in 110 parts by weight to 500 parts by weight and an oxetane compound (C) in 5 parts by weight to 85 parts by weight, or a cured material thereof.

Another embodiment of the present specification provides an image display device comprising the polarizing plate described above.

Another embodiment of the present specification provides an adhesive composition for a polarizing plate comprising a first epoxy compound (A) comprising one or more alicyclic epoxy rings, and, with respect to 100 parts by weight of the first epoxy compound (A), a second epoxy compound (B) comprising one or more glycidyl ether groups in 110 parts by weight to 500 parts by weight and an oxetane compound (C) in 5 parts by weight to 85 parts by weight.

Advantageous Effects

A polarizing plate according to one embodiment of the present specification has an advantage of having a small thickness by providing a protective film on just one surface of a polarizer instead of providing a protective film on both surfaces of the polarizer.

In addition, a polarizing plate according to one embodiment of the present specification is effective in obtaining excellent high temperature durability.

A polarizing plate according to one embodiment of the present specification has an advantage of having excellent adhesive strength between a protective film and a polarizer.

DESCRIPTION OF DRAWINGS

FIG. 1 and FIG. 2 are a cross-sectional view of a polarizing plate according to one embodiment of the present specification.

FIG. 3 is a cross-sectional view illustrating one example of an image display device according to one embodiment of the present specification.

MODE FOR DISCLOSURE

Hereinafter, the present specification will be described. In the present specification, two or more elements being consecutively provided, for example, a term 「 consecutively provided A and B 」, also comprises, while the elements A and B are disposed in this order, a case of providing other elements between A and B, for example, a case of A and C and B being deposited in this order.

In addition, two elements being formed each other or directly formed in the present specification, for example, 「 B being directly formed on A 」, may mean B being directly formed on at least one main surface of A without providing other elements therebetween.

In the present specification, a unit parts by weights means a ratio of weight between each component.

In the present specification, the term 「 curing of composition 」 means a process in which the composition is changed so as to exhibit adhesive or gluing properties by a physical action or a chemical reaction of components of the composition. In addition, the term 「 active energy rays 」 in the present specification may mean a particle beam such as an α particle beam, a proton beam, a neutron beam and an electron beam as well as microwaves, infrared rays (IR), ultraviolet rays (UV), X-rays and γ-rays, and may commonly be ultraviolet rays, an electron beam or the like. In addition, 「 active energy ray-curable 」 may mean that such curing may be induced by irradiation of active energy rays. In one embodiment of the present disclosure, curing of an active energy ray-curable composition may be conducted through a free radical polymerization or a cation reaction by irradiation of active energy rays, and preferably, a free radical polymerization and a cation reaction may be conducted together simultaneously or consecutively.

In the present specification, the 「active energy ray-curable composition」may be simply referred to as 「composition」.

Hereinafter, a polarizing plate according to one embodiment of the present specification and an image display device comprising the same will be described with reference to accompanying drawings.

FIG. 1 illustrates a polarizing plate comprising a polarizer (10), a protective layer (20) directly formed on one surface of the polarizer, and an adhesive layer (50) and a protective film (30) consecutively provided on a surface of the polarizer on which the protective layer is not formed. FIG. 2 illustrates a polarizing plate in which a gluing layer (40) is provided on the protective layer (20) of the polarizing plate of FIG. 1.

FIG. 3 illustrates an image display device in which a liquid crystal panel (200) is provided on the gluing layer (40) of the polarizing plate of FIG. 2. Between the polarizer (10) and the protective film (30) of FIG. 3, an adhesive layer (50) may be provided.

One embodiment of the present specification provides a polarizing plate comprising a polarizer; a protective layer directly formed on one surface of the polarizer; and an adhesive layer and a protective film consecutively provided on a surface of the polarizer on which the protective layer is not formed, wherein the adhesive layer is a resin layer comprising an active energy ray-curable composition comprising a first epoxy compound (A) comprising one or more alicyclic epoxy rings, and, with respect to 100 parts by weight of the first epoxy compound (A), a second epoxy compound (B) comprising one or more glycidyl ether groups in 110 parts by weight to 500 parts by weight and an oxetane compound (C) in 5 parts by weight to 85 parts by weight, or a cured material thereof.

A polarizer is commonly prepared with a hydrophilic resin such as polyvinyl alcohol, and therefore, is generally vulnerable to moisture. In addition, since a polarizer generally goes through an elongation process in the preparation, shrinkage and the like readily occur under a humidity condition, which leads to a problem of worsening optical properties and the like of a polarizing plate. Accordingly, in order to enhance properties of a polarizer, a protective film typified by a polyethylene terephthalate (PET) film or the like is generally attached on both surfaces of the polarizer, and absence of a protective film causes problems of greatly reducing durability and optical properties due to poor dimensional stability of the polarizer, and significantly weakening water resistance.

For this, one exemplary structure of the polarizing plate of the present specification employs a structure in which, while obtaining a thinner and lighter structure since a protective film is not attached on at least one surface of a polarizer, a protective layer is directly formed on a surface of the polarizer on which the protective film is not attached.

The polarizing plate according to one embodiment of the present specification may not further comprise a protective film on the other surface of the polarizer-facing surface of the protective layer. A polarizing plate in which a protective film is not attached on at least one surface of a polarizer as above may also be referred to as a thin polarizing plate (thin polarizer).

In the present specification, a polarizing plate having a protective layer provided on one surface of a polarizer, and having a protective film provided on the other surface of the polarizer as above may be referred to as a 'one side-type thin polarizing plate'.

Generally, when a protective film is included on just one surface of a polarizer, and a protective layer is directly formed on a surface of the polarizer not comprising the protective film, the polarizer may not be sufficiently protected with one protective film, and cracks are produced on the polarizer due to stress caused when the polarizer shrinks at a high temperature of 80° C. or higher.

In the present specification, so as to suppress the polarizer cracks with just one protective film, high temperature durability of an adhesive layer located between the polarizer and the protective film is improved suppressing the adhesive layer from being readily expanded even at a high temperature, and as a result, cracks on the polarizer are suppressed.

Specifically, in one embodiment of the present specification, the adhesive layer is a resin layer comprising an active energy ray-curable composition comprising a first epoxy compound (A) comprising one or more alicyclic epoxy rings, a second epoxy compound (B) comprising one or more glycidyl ether groups, and an oxetane compound (C), or a cured material thereof, and by adjusting a content between the compounds, high temperature durability of the adhesive layer may be enhanced.

In one embodiment of the present specification, the active energy ray-curable composition may comprise, with respect to 100 parts by weight of the first epoxy compound (A) comprising one or more alicyclic epoxy rings, the second epoxy compound (B) comprising one or more glycidyl ether groups in 110 parts by weight to 500 parts by weight and the oxetane compound (C) in 5 parts by weight to 85 parts by weight.

In one embodiment of the present specification, the active energy ray-curable composition may comprise, with respect to 100 parts by weight of the first epoxy compound (A) comprising one or more alicyclic epoxy rings, the second epoxy compound (B) comprising one or more glycidyl ether groups in 110 parts by weight to 450 parts by weight, 120 parts by weight to 400 parts by weight, or 130 parts by weight to 300 parts by weight.

In one embodiment of the present specification, the active energy ray-curable composition may comprise, with respect to 100 parts by weight of the first epoxy compound (A) comprising one or more alicyclic epoxy rings, the second epoxy compound (B) comprising one or more glycidyl ether groups in 110 parts by weight to 240 parts by weight, 120 parts by weight to 220 parts by weight, or 140 parts by weight to 200 parts by weight.

In one embodiment of the present specification, the active energy ray-curable composition may comprise, with respect to 100 parts by weight of the first epoxy compound (A) comprising one or more alicyclic epoxy rings, the oxetane compound (C) in 5 parts by weight to 60 parts by weight, 10 parts by weight to 55 parts by weight, 20 parts by weight to 53 parts by weight, or 26 parts by weight to 53 parts by weight.

When the content of each of the first epoxy compound (A) comprising one or more alicyclic epoxy rings, the second epoxy compound (B) comprising one or more glycidyl ether groups, and the oxetane compound (C) satisfies the above-mentioned numerical range, the composition has a high glass transition temperature (Tg) enhancing high temperature durability and increasing strength (hardness) of the adhesive layer formed from the composition, and by the composition having excellent softness, adhesive strength of the adhesive layer for the polarizer is superior.

In one embodiment of the present specification, the first epoxy compound (A) comprises one or more alicyclic epoxy rings, and means a compound having an epoxy group formed between adjacent two carbon atoms forming an aliphatic ring. It may be referred to as an alicyclic epoxy compound, and, as shown in the following Chemical Formula B1, may be a compound having at least one epoxy group bonding to an alicyclic ring in the molecule.

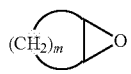

[Chemical Formula B1]

In Chemical Formula B1, m is an integer of 2 to 5, and a compound in which a group obtained by removing one or a plurality of hydrogen atoms in $(CH_2)m$ from Chemical Formula B1 bonds to another chemical structure having no aromatic ring may be an alicyclic epoxy compound. In other words, it may mean a compound comprising one or more epoxidized aliphatic cyclic groups.

By the epoxy compound comprising an alicyclic epoxy compound, a glass transition temperature of the adhesive composition forming the adhesive layer increases allowing the adhesive layer to secure sufficient durability, and as a result, occurrences of cracks on the polarizer may be prevented even under a heat resistance or heat shock condition.

In the alicyclic epoxy compound comprising the epoxidized aliphatic cyclic group, the epoxidized aliphatic cyclic group may mean, for example, a compound having an epoxy group formed on the alicyclic ring. The hydrogen atom forming the alicyclic ring may be arbitrarily substituted with a substituent such as an alkyl group. Examples of the alicyclic epoxy compound may comprise compounds specifically illustrated below, however, the usable epoxy compound is not limited to the following types.

An example of the alicyclic epoxy compound may comprise an epoxycyclohexylmethyl epoxycyclohexanecarboxylate-based compound represented by the following Chemical Formula 1.

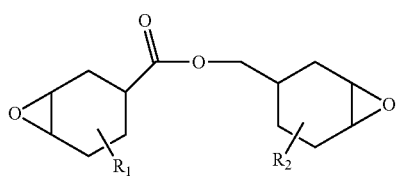

[Chemical Formula 1]

In Chemical Formula 1, $R_1$ and $R_2$ each independently represent hydrogen or an alkyl group.

In the present specification, the term alkyl group may mean, unless particularly defined otherwise, a linear, branched or cyclic alkyl group having 1 to 20 carbon atoms, 1 to 16 carbon atoms, 1 to 12 carbon atoms, 1 to 8 carbon atoms or 1 to carbon atoms, and the alkyl group may be arbitrarily substituted with one or more substituents, or may be unsubstituted.

Another example of the alicyclic epoxy compound may comprise an epoxycyclohexanecarboxylate-based compound of alkanediol represented by the following Chemical Formula 2.

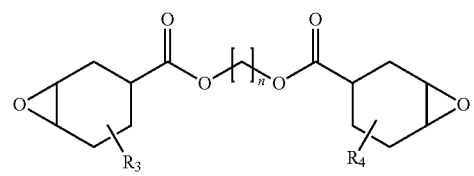

[Chemical Formula 2]

In Chemical Formula 2, $R_3$ and $R_4$ each independently represent hydrogen or an alkyl group, and n represents an integer of 2 to 20.

In addition, another example of the alicyclic epoxy compound may comprise an epoxycyclohexylmethyl ester-based compound of dicarboxylic acid represented by the following Chemical Formula 3.

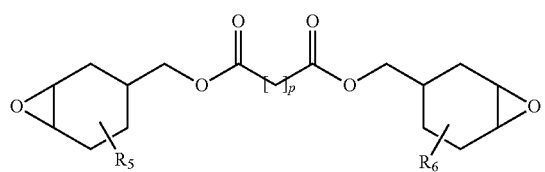

[Chemical Formula 3]

In Chemical Formula 3, $R_5$ and $R_6$ each independently represent hydrogen or an alkyl group, and p represents an integer of 2 to 20.

Another example of the alicyclic epoxy compound may comprise an epoxycyclohexylmethyl ether-based compound of polyethylene glycol represented by the following Chemical Formula 4.

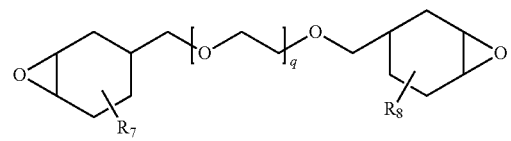

[Chemical Formula 4]

In Chemical Formula 4, $R_7$ and $R_8$ each independently represent hydrogen or an alkyl group, and q represents an integer of 2 to 20.

Another example of the alicyclic epoxy compound may comprise an epoxycyclohexylmethyl ether-based compound of alkanediol represented by the following Chemical Formula 5.

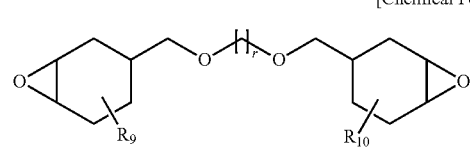

[Chemical Formula 5]

In Chemical Formula 5, $R_9$ and $R_{10}$ each independently represent hydrogen or an alkyl group, and r represents an integer of 2 to 20.

Another example of the alicyclic epoxy compound may comprise a diepoxytrispiro-based compound represented by the following Chemical Formula 6.

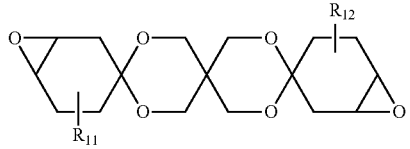

[Chemical Formula 6]

In Chemical Formula 6, $R_{11}$ and $R_{12}$ each independently represent hydrogen or an alkyl group.

Another example of the alicyclic epoxy compound may comprise a diepoxymonospiro-based compound represented by the following Chemical Formula 7.

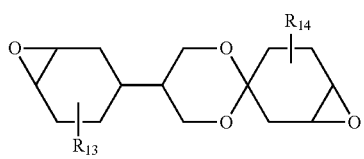

[Chemical Formula 7]

In Chemical Formula 7, $R_{13}$ and $R_{14}$ each independently represent hydrogen or an alkyl group.

Another example of the alicyclic epoxy compound may comprise a vinylcyclohexene diepoxide compound represented by the following Chemical Formula 8.

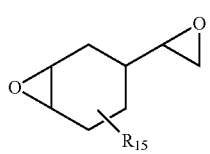

[Chemical Formula 8]

In Chemical Formula 8, $R_{15}$ represents hydrogen or an alkyl group.

Another example of the alicyclic epoxy compound may comprise an epoxycyclopentyl ether compound represented by the following Chemical Formula 9.

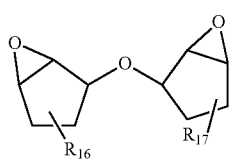

[Chemical Formula 9]

In Chemical Formula 9, $R_{16}$ and $R_{17}$ each independently represent hydrogen or an alkyl group.

Another example of the alicyclic epoxy compound may comprise a diepoxytricyclodecane compound represented by the following Chemical Formula 10.

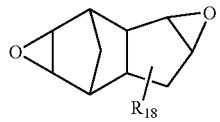

[Chemical Formula 10]

In Chemical Formula 10, $R_{18}$ represents hydrogen or an alkyl group.

More specifically, as the alicyclic epoxy compound, an epoxycyclohexylmethyl epoxycyclohexanecarboxylate compound, an epoxycyclohexanecarboxylate compound of alkandiol, an epoxycyclohexylmethyl ester compound of dicarboxylic acid or an epoxycyclohexylmethyl ether compound of alkanediol is preferably used, and one or more selected from the group consisting of an ester compound of 7-oxabicyclo[4,1,0]heptane-3-carboxylic acid and (7-oxabicyclo[4,1,0]hepto-3-yl)methanol (compound in which $R_1$ and $R_2$ are hydrogen in Chemical Formula 1); an ester compound of 4-methyl-7-oxabicyclo[4,1,0]heptane-3-carboxylic acid and (4-methyl-7-oxa-bicyclo[4,1,0]hepto-3-yl) methanol (compound in which $R_1$ is 4-$CH_3$ and $R_2$ is 4-$CH_3$ in Chemical Formula 1); an ester compound of 7-oxabicyclo[4,1,0]heptane-3-carboxylic acid and 1,2-ethanediol (compound in which $R_3$ and $R_4$ are hydrogen and n is 1 in Chemical Formula 2); an ester compound of (7-oxabicyclo[4,1,0]hepto-3-yl)methanol and adipic acid (compound in which $R_5$ and $R_6$ are hydrogen and p is 2 in Chemical Formula 3); an ester compound of (4-methyl-7-oxabicyclo[4,1,0]hepto-3-yl)methanol and adipic acid (compound in which $R_5$ and $R_6$ are 4-$CH_3$ and p is 2 in Chemical Formula 3); and an ether compound of (7-oxabicyclo[4,1,0]hepto-3-yl)methanol and 1,2-ethanediol (compound in which $R_9$ and $R_{10}$ are hydrogen and r is 1 in Chemical Formula 5) are preferably used, however, the alicyclic epoxy compound is not limited thereto.

In one embodiment of the present specification, the first epoxy compound (A) is for increasing a glass transition temperature (Tg) of the composition, and for providing strength (hardness) of the adhesive layer formed from the composition, and is preferably 3,4-epoxycyclohexylmethyl-3,4'-epoxycyclohexanecarboxylate.

In one embodiment of the present specification, the second epoxy compound (B) is not particularly limited as long as it comprises one or more glycidyl ether groups, and it may be referred to as a glycidyl ether-type epoxy compound. In addition, by comprising the glycidyl ether-type epoxy compound, the glycidyl ether reaction group forms a chain that is soft and has polarity in the adhesive layer after the curing reaction, which enhances adhesive strength of the adhesive layer for the polarizer.

Examples of the glycidyl ether-type epoxy compound may comprise aliphatic polyhydric alcohols or an alkylene oxide thereof, for example, polyglycidyl ether of ethylene oxide or propylene oxide adduct. Specific examples of the glycidyl ether-type epoxy compound may comprise novolac epoxy, bisphenol A-based epoxy, bisphenol F-based epoxy, brominated bisphenol epoxy, n-butyl glycidyl ether, aliphatic glycidyl ether (12 to 14 carbon atoms), 2-ethylhexyl glycidyl ether, phenyl glycidyl ether, o-cresyl glycidyl ether, nonylphenyl glycidyl ether, ethylene glycol diglycidyl ether, diethylene glycol diglycidyl ether, propylene glycol diglycidyl ether, tripropylene glycol diglycidyl ether, neopentyl glycol diglycidyl ether, 1,4-butanediol diglycidyl ether, 1,6-hexanediol diglycidyl ether, trimethylolpropane triglycidyl ether, trimethylolpropane diglycidyl ether, trimethylolpropane polyglycidyl ether, polyethylene glycol diglycidyl ether or glycerin triglycidyl ether and the like. In addition, glycidyl ether having a cyclic aliphatic skeleton such as 1,4-cyclohexanedimethanol diglycidyl ether, a hydrogen-added compound of an aromatic epoxy compound or the like may be included as an example, and glycidyl ether having a cyclic aliphatic skeleton, for example, glycidyl ether having a cyclic aliphatic skeleton with, for example, 3 to 20 carbon atoms, 3 to 16 carbon atoms or 3 to 12 carbon atoms may be used, however, the glycidyl ether-type epoxy compound is not limited thereto.

In one embodiment of the present specification, the second epoxy compound (B) is for enhancing adhesive strength by providing softness to the composition, and comprising an aliphatic ring is more preferred, and 1,4-cyclohexanedimethanol diglycidyl ether is particularly preferred.

In one embodiment of the present specification, the oxetane compound (C) is not particularly limited as long as it has at least one oxetanyl group in the molecule, and various oxetane compounds well known in the art may be used.

As the oxetane compound, various types of compounds may be used without particular limit, and examples thereof may comprise 3-ethyl-3-[(3-ethyloxetan-3-yl)methoxymethyl] oxetane, 1,4-bis [(3-ethyloxetan-3-yl)methoxymethyl] benzene, 1,4-bis [(3-ethyloxetan-3-yl)methoxy] benzene, 1,3-bis [(3-ethyloxetan-3-yl)methoxy] benzene, 1,2-bis [(3-ethyloxetan-3-yl)methoxy] benzene, 4,4'-bis [(3-ethyloxetan-3-yl)methoxy] biphenyl, 2,2'-bis [(3-ethyloxetan-3-yl)methoxy] biphenyl, 3,3',5,5'-tetramethyl-4,4'-bis [(3-ethyloxetan-3-yl)methoxy] biphenyl, 2,7-bis [(3-ethyloxetan-3-yl)methoxy] naphthalene, bis [4-{(3-ethyloxetan-3-yl)methoxy}phenyl] methane, bis [2-{(3-ethyloxetan-3-yl)methoxy}phenyl] methane, 2,2-bis [4-{(3-ethyloxetan-3-yl)methoxy}phenyl] propane, an etherified denatured product of a novolac-type phenol-formaldehyde resin by 3-chloromethyl-3-ethyloxetane, 3(4),8(9)-bis [(3-ethyloxetan-3-yl)methoxymethyl]-tricyclo[5.2.1.0 2,6]decane, 2,3-bis [(3-ethyloxetan-3-yl)methoxymethyl] norbornane, 1,1,1-tris [(3-ethyloxetan-3-yl)methoxymethyl] propane, 1-butoxy-2,2-bis [(3-ethyloxetan-3-yl)methoxymethyl] butane, 1,2-bis [{2-(3-ethyloxetan-3-yl)methoxy}ethylthio] ethane, bis [{4-(3-ethyloxetan-3-yl)methylthio}phenyl] sulfide, 1,6-bis [(3-ethyloxetan-3-yl)methoxy]-2,2,3,3,4,4,5,5-octafluorohexane or the like, but are not limited thereto. These oxetane compounds may be readily obtained as commercial products, and specific examples thereof may comprise ARON OXETANE OXT-101 (manufactured by TOAGOSEI Co., Ltd.), ARON OXETANE OXT-121 (manufactured by TOAGOSEI Co., Ltd.), ARON OXETANE OXT-211 (manufactured by TOAGOSEI Co., Ltd.), ARON OXETANE OXT-221 (manufactured by TOAGOSEI Co., Ltd.), ARON OXETANE OXT-212 (manufactured by TOAGOSEI Co., Ltd.) and the like.

In one embodiment of the present specification, the active energy ray-curable composition may further comprise a curable component, and the curable component may be a compound having a (meth)acryloyl group, or a compound having a plurality of polymerizable double bonds such as a vinyl group. For example, tripropylene glycol diacrylate, 1,9-nonanediol diacrylate, tricyclodecane dimethanol diacrylate, cyclic trimethylolpropane formal acrylate, dioxane glycol diacrylate, EO-modified diglycerin tetraacrylate, Aronix M-220 (manufactured by TOAGOSEI Co., Ltd.), light acrylate 1,9 ND-A (manufactured by Kyoeisha Chemical Co., Ltd.), light acrylate DGE-4A (manufactured by Kyoeisha Chemical Co., Ltd.), light acrylate DCP-A (manufactured by Kyoeisha Chemical Co., Ltd.), SR-531 (manufactured by Sartomer Co., Ltd.), CD-536 (manufactured by Sartomer Co., Ltd.) and the like may be included. In addition, as necessary, various epoxy (meth)acrylates, urethane (meth)acrylates, polyester (meth)acrylates, various (meth)acrylate-based monomers or the like may be included. Comprising the curable component has advantages of increasing a curing rate, and accomplishing high-level curing even with low light intensity.

In one embodiment of the present specification, the curable component may be included in 10 parts by weight to 50 parts by weight or 20 parts by weight to 40 parts by weight with respect to 100 parts by weight of the first epoxy compound (A).

In one embodiment of the present specification, the active energy ray-curable composition may further comprise an aromatic epoxy compound.

In one embodiment of the present specification, the aromatic epoxy compound comprises an aromatic group in the molecule, and examples thereof may comprise bisphenol-type epoxy resins such as a bisphenol A-based epoxy compound, a bisphenol F-based epoxy compound, bisphenol S epoxy or brominated bisphenol-based epoxy; novolac-type epoxy resins such as a phenol novolac-type epoxy resin or a cresol novolac-type epoxy resin; cresol epoxy, resorcinol glycidyl ether and the like, but are not limited thereto.

In one embodiment of the present specification, the composition may further comprise one or more types selected from the group consisting of a cation initiator, a radical initiator and a photosensitizer.

In one embodiment of the present specification, the cation initiator is not particularly limited as long as it is capable of initiating a cation reaction by applying or irradiating light, and for example, a cation photoinitiator initiating a cation reaction by irradiating energy rays may be used.

In one embodiment, an onium salt- or an organometallic salt-based ionized cation initiator or a non-ionized cation photoinitiator such as organosilane- or latent sulfonic acid-based, or other non-ionized compounds may be used as the cation photoinitiator. Examples of the onium salt-based initiator may comprise a diaryliodonium salt, a triarylsulfonium salt, an aryldiazonium salt or the like, examples of the organometallic salt-based initiator may comprise iron arene or the like, examples of the organosilane-based initiator may comprise o-nitrobenzyl triaryl silyl ether, triaryl silyl peroxide, acyl silane or the like, and examples of the latent sulfonic acid-based initiator may comprise alpha-sulfonyloxy ketone, alpha-hydroxymethylbenzoin sulfonate or the like, however, the initiator is not limited thereto. In addition, as the cation initiator, a mixture of an iodine-based initiator and a photosensitizer may also be used.

As the cation initiator, an ionized cation photoinitiator may be used, and for example, an onium salt-based ionized cation photoinitiator may be used, or a triarylsulfonium salt-based ionized cation photoinitiator may be used, however, the cation initiator is not limited thereto.

In one embodiment of the present specification, the active energy ray-curable composition may comprise the cation initiator in 0.01 parts by weight to 10 parts by weight, or in 0.1 parts by weight to 5 parts by weight. In the above-described ratio, compositions having excellent curing efficiency and excellent properties after curing may be provided.

The active energy ray-curable composition may further comprise a photoinitiator as a radical initiator capable of initiating a polymerization or crosslinking reaction of an acrylic compound. Examples of the photoinitiator may comprise initiators such as a benzoin-based, a hydroxyketone compound, an aminoketone compound or a phosphine oxide compound, and for example, a phosphine oxide compound or the like may be used. More specific examples of the photoinitiator may comprise benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic ester, oligo[2-hydroxy-2-methyl-1-[4-(1-methylvinyl)phenyl]propanone], bis(2,4,6-trimethylbenzoyl)-phenyl-phosphine oxide, 2,4,6-trimethylbenzoyl-diphenyl-phosphine oxide and the like, but are not limited thereto.

In one embodiment of the present specification, the photoinitiator may be included in 0.1 parts by weight to 10 parts by weight, or 0.5 parts by weight to 5 parts by weight based on the total weight of the active energy ray-curable composition. When the photoinitiator is included in less than 0.1 parts by weight based on the above criterion, peel-off failure may occur due to a decrease in the adhesion caused by an insufficient degree of curing, and the content being greater than 10 parts by weight may cause a problem of reducing adhesive strength due to migration of decomposition products of the initiator or the unreacted initiator toward an adhesion interface.

In one embodiment of the present specification, the active energy ray-curable composition may further comprise a photosensitizer (E). The photosensitizer is a compound capable of initiating an iodine-based cation initiator by being activated with long wavelength UV irradiation. Examples thereof may comprise iodonium bis(4-methylphenyl) hexafluorophosphate, [4-methylphenyl-(4-(2-methylpropyl)phenyl)]iodonium hexafluorophosphate, 4-isopropyl-4'-methyldiphenyliodonium-tetrakis(pentafluorophenyl)borate and the like, but are not limited thereto. The content of the photosensitizer is preferably from 0.2 parts by weight to 20 parts by weight, more preferably from 0.2 parts by weight to 10 parts by weight, and most preferably from 0.2 parts by weight to 5 parts by weight with respect to 100 parts by weight of the active energy ray-curable composition.

In one embodiment of the present specification, the photopolymerization initiator and the photosensitizer are preferably included in a weight ratio of 0.1:1 to 4:1 or 2:1 to 4:1. Satisfying the above-mentioned range has an advantage of increasing photoinitiation efficiency.

In one embodiment of the present specification, storage modulus of the adhesive layer may be from 700 Mpa to 1,600 Mpa, preferably 800 from Mpa to 1,400 Mpa, and more preferably from 900 Mpa to 1,200 Mpa at 80° C. under a measurement condition of a temperature range of −30° C. to 160° C., a temperature raising rate of 5° C./min, a frequency of 1 Hz and strain of 10%. When storage modulus of the adhesive layer satisfies the above-mentioned numerical range, stress applied to the polarizer is effectively suppressed, which is effective in effectively suppressing crack occurrences on the polarizer caused by shrinkage or expansion of the polarizer under a high temperature or high humidity environment. In addition, adhesive strength for the polarizer is enhanced. As a result, by suppressing shrinkage and expansion of the polarizing plate at a high temperature, occurrences of light leakage may be prevented when using the polarizing plate in a liquid crystal panel and the like, and excellent adhesive strength is obtained.

Storage modulus of the adhesive layer may be measured using a dynamic mechanical analyzer (DMA) after coating a photocurable composition having the same composition as the adhesive layer on a release film (for example, polyethylene terephthalate film) to a thickness of 50 μm, curing the result by irradiating ultraviolet rays under a light intensity condition of 1000 mJ/cm$^2$ or greater, removing the release film, and laser cutting the specimen to a certain size. Herein, storage modulus when constantly tensioning with 10% strain while, as the measurement temperature, raising the temperature up to 160° C. from a starting temperature of −30° C. at a temperature raising rate of 5° C./min is measured, and a storage modulus value at 80° C. is recorded.

In one embodiment of the present specification, the polarizing plate may satisfy the following General Formula 1, and may preferably satisfy the following General Formula 1-1 or the following General Formula 1-2.

$P \geq 3.5$ N/cm     [General Formula 1]

$P \geq 4.0$ N/cm     [General Formula 1-1]

$P \geq 5.0$ N/cm     [General Formula 1-2]

In General Formula 1, General Formula 1-1 and General Formula 1-2, P means peel strength measured while peeling the protective film from the adhesive layer at 25° C. at a peeling angle of 90° and a peeling rate of 300 mm/min. P may be measured using a texture analyzer device. When the protective film has peel strength as above, adhesive strength of the protective film for the adhesive layer is strong, and therefore, a protecting effect by the protective film may be enhanced even under a harsh environment. The peel strength may be accomplished by adjusting a content of each of the first epoxy compound (A), the second epoxy compound (B) and the oxetane compound (C) of the active energy ray-curable composition for forming the adhesive layer to the specific range described above.

As a result of a high temperature crack growth test on the polarizer in one embodiment of the present specification, a ratio of the number of light leaking cracks (C2) with respect to the number of initial total cracks (C1) may be 20% or less, preferably 15% or less, and more preferably 10% or less or 5% or less. When satisfying the above-mentioned numerical range, the polarizing plate maintains excellent high temperature durability when used in an actual product, and therefore, crack growth may be suppressed even when micro cracks are produced on the polarizer, and light leakage may be effectively prevented.

The high temperature crack growth test is for visually identifying crack growth after artificially producing arbitrary cracks on the polarizer and leaving the polarizer unattended under a high temperature environment. When the adhesive layer has excellent adhesive strength, growth of the produced cracks may be sufficiently suppressed, however, when adhesive strength of the adhesive layer decreases, cracks grow and split resulting in light leakage. In other words, the high temperature crack growth test is for testing an adhering ability of the adhesive layer for the polarizer, and for visually presenting the adhering ability.

The high temperature crack growth test process may be described as follows. With the polarizer having an adhesive layer and a protective film consecutively laminated on any one surface thereof, cracks are induced on the other surface of the polarizer using a blunt pencil or the like. After that, a protective layer is laminated on the other surface of the protective film-laminated surface of the polarizer. A polarizing plate prepared as above is left unattended for 100 hours to 300 hours at 80° C. After that, the polarizing plate is irradiated with light, and it is observed whether light leaks by crack splitting due to shrinkage of the polarizer, and the number of light leaking cracks (C2) among the induced initial cracks (C1) is calculated to obtain a rate of crack occurrences in the polarizing plate. For example, when the number of initial induced cracks is 100 and the number of light leaking cracks is 10, the ratio of the number of light leaking cracks (C2) with respect to the number of total cracks (C1) is 10%.

In one embodiment of the present specification, the adhesive layer may have a glass transition temperature of 90° C. or higher, preferably 100° C. or higher, and more preferably 110° C. or higher. When satisfying the above-mentioned numerical range, high temperature durability of the adhesive layer formed by the active energy ray-curable composition may be enhanced. The glass transition temperature of the adhesive layer may be calculated by measuring a glass transition temperature of a specimen curing the active energy ray-curable composition having the same composition as the adhesive layer.

The glass transition temperature may be measured using methods commonly used in the art. For example, the active energy ray-curable composition is coated on a release film (for example, polyethylene terephthalate film) to a thickness of 2 μm to 3 μm, and after curing the result by irradiating ultraviolet rays under a light intensity condition of 1000 mJ/cm² or greater, the release film is removed to prepare a specimen. Then, this test sample is weighed to approximately 1 mg to 10 mg in an open cell made of aluminum, and a reversing heat flow (non-thermal component) behavior of the composition is obtained at a temperature raising rate of 10° C./min under the nitrogen atmosphere of 50 ml/min using a temperature-modulated DSC. The temperature at a point where a straight line that is in an equidistance in a longitudinal axis from a line extending a base line on a low temperature side and a base line on a high temperature side of the reversing heat flow and a curve of a stair-shaped change portion of glass transition intersect is employed as the glass transition temperature (Tg).

In one embodiment of the present specification, the adhesive layer may have a thermal expansion coefficient of 130 ppm/K or less, 120 ppm/K or less, 100 ppm/K or less, greater than or equal to 10 ppm/K and less than or equal to 130 ppm/K, or greater than or equal to 10 ppm/K and less than or equal to 100 ppm/K at 80° C.

The adhesive layer may have a thermal expansion coefficient of 130 ppm/K or less, 120 ppm/K or less, 100 ppm/K or less, greater than or equal to 10 ppm/K and less than or equal to 130 ppm/K, or greater than or equal to 10 ppm/K and less than or equal to 100 ppm/K when measured at a temperature of lower than 80° C.

The adhesive layer may have a thermal expansion coefficient of 130 ppm/K or less, 120 ppm/K or less, 100 ppm/K or less, greater than or equal to 10 ppm/K and less than or equal to 130 ppm/K, or greater than or equal to 10 ppm/K and less than or equal to 100 ppm/K when measured at a temperature of higher than 40° C. and lower than 80° C.

The adhesive layer may have a thermal expansion coefficient of 130 ppm/K or less, 120 ppm/K or less, 100 ppm/K or less, greater than or equal to 10 ppm/K and less than or equal to 130 ppm/K, or greater than or equal to 10 ppm/K and less than or equal to 100 ppm/K at 70° C.

The adhesive layer may have a thermal expansion coefficient of 130 ppm/K or less, 120 ppm/K or less, 100 ppm/K or less, greater than or equal to 10 ppm/K and less than or equal to 130 ppm/K, or greater than or equal to 10 ppm/K and less than or equal to 100 ppm/K at 60° C.

When the adhesive layer has a thermal expansion coefficient satisfying the above-mentioned range, there is an advantage in that crack occurrences on the polarizing plate are effectively suppressed under a heat shock environment. The method of measuring a thermal expansion coefficient is not particularly limited, and for example, a cured specimen having a thickness of 50 dun is cut to a size of a width of 6 mm and a length of 10 mm, and changes in the length are measured while raising a temperature from 30° C. to 150° C. while maintaining a tension load at 0.05 N. Herein, the temperature raising rate is 5° C./min, and, after the measurement is completed, the thermal expansion coefficient (CTE) value is calculated as a length changed from 40° C. to a target temperature. The target temperature is a temperature of 80° C. or lower than 80° C., and for example, is 70° C. or 60° C.

In one embodiment of the present specification, the adhesive layer has a thickness of greater than or equal to 0.5 μm and less than or equal to 8 μm, greater than or equal to 1 μm and less than or equal to 5 μm, or greater than or equal to 1 μm and less than or equal to 3 μm. When the adhesive layer thickness is less than the above-mentioned range, the degree of bonding between the protective film and the polarizer may become poor and high temperature durability may decline, and the thickness being greater than the above-mentioned range is not suitable in terms of thinning of the polarizing plate.

In one embodiment of the present specification, the active energy ray-curable composition may further comprise one or more additives selected from the group consisting of a dye, a pigment, an ultraviolet stabilizer, an antioxidant, a colorant, a reinforcing agent, a filler, a defoamer, a surfactant and a plasticizer as necessary.

In one embodiment of the present specification, the protective layer may be directed formed on the polarizer. The protective layer has a function of protecting the polarizer without providing a separate adhesive layer therebetween, and is different from the protective film laminated on the polarizer using the adhesive layer as a medium.

The protective layer may be a resin layer comprising an active energy ray-curable composition for forming a protective layer or a cured material thereof.

The active energy ray-curable composition for forming a protective layer may comprise an epoxy compound and an oxetane compound. Descriptions on the epoxy compound and the oxetane compound may be replaced by the descriptions on the active energy ray-curable composition for forming an adhesive layer provided above.

In one embodiment of the present specification, the method for forming a protective layer may be the same as or different from the method for forming an adhesive layer. For example, a method of coating the photocurable composition for a polarizing plate protective layer on one surface of a polarizer using a coating method well known in the art such as spin coating, bar coating, roll coating, gravure coating, blade coating or the like, and then curing the result through irradiating ultraviolet rays may be used. Alternatively, a method of coating the photocurable composition for a polarizing plate protective layer on a separate substrate film (material: polyethylene terephthalate, cycloolefin polymer or the like), laminating the result on a polarizer, curing the result through irradiating ultraviolet rays, and then peeling off the substrate film may be used.

In one embodiment of the present specification, the protective layer has a thickness of greater than or equal to 4 µm and less than or equal to 11 µm, preferably greater than or equal to 5 µm and less than or equal to, 10 µm, and more preferably greater than or equal to 6 µm and less than or equal to 8 µm. The protective layer thickness being less than the above-mentioned range may cause concern of reducing hardness or high temperature durability of the protective layer, and the thickness being greater than the above-mentioned range is not suitable in terms of thinning of the polarizing plate.

Protective Film

In one embodiment of the present specification, the protective film is for supporting and protecting the polarizer, and protective films made of various materials generally known in the art such as a polyethylene terephthalate (PET) film, a cycloolefin polymer (COP) film or an acryl-based film may be used. Considering optical properties, durability, economic feasibility and the like, using polyethylene terephthalate among these is particularly preferred.

In one embodiment of the present specification, the protective film may have storage modulus of 1,500 Mpa or greater, preferably 1,800 Mpa or greater, and more preferably 2,000 Mpa or greater at 80° C. to 100° C. Satisfying the above-mentioned numerical range may increase a polarizer protecting effect of the protective film. Specifically, tearing of the polarizer caused by stress generated by shrinkage of the polarizer under a high temperature environment may be prevented.

Meanwhile, attaching the polarizer and the protective film may be, performed using a method of coating an adhesive composition for a polarizing plate on the surface of the polarizer or the protective film using a roll coater, a gravure coater, a bar coater, a knife coater, a capillary coater or the like, and then heat laminating these using a laminating roll, laminating these through room temperature pressing, or irradiating UV after laminating these. The adhesive composition for a polarizing plate will be described later.

Polarizer

As the polarizer in one embodiment of the present specification, polarizers well known in the art, for example, films formed with polyvinyl alcohol (PVA) comprising iodine or a dichroic dye may be used. The polarizer may be prepared by dyeing a polyvinyl alcohol film with iodine or a dichroic dye, however, the preparation method is not particularly limited.

In the present specification, the polarizer means a state not comprising a protective layer (or protective film), and the polarizing plate means a state comprising a polarizer and a protective layer (or protective film).

In one embodiment of the present specification, the polarizer may have a thickness of greater than or equal to 5 µm and less than or equal to 40 µm, and more preferably greater than or equal to 5 µm and less than or equal to 25 µm. When the polarizer thickness is smaller than the above-mentioned range, optical properties may decline, and when the thickness is larger than the above-mentioned range, the degree of polarizer shrinkage at a low temperature (approximately −30° C.) increases causing a problem in overall heat resistance of the polarizing plate.

In one embodiment of the present specification, when the polarizer is a polyvinyl alcohol-based film, the polyvinyl alcohol-based film may be used without particularly limit as long as it comprises a polyvinyl alcohol resin or a derivative thereof. Herein, the derivative of the polyvinyl alcohol resin may comprise, but is not limited to, a polyvinyl formal resin, a polyvinyl acetal resin and the like. Alternatively, as the polyvinyl alcohol-based film, commercially available polyvinyl alcohol-based films generally used for polarizer preparation in the art such as P30, PE30 or PE60 of Kuraray Co. Ltd., and M2000, M3000 or M6000 of Nippon Gohsei Co., Ltd. may also be used.

In one embodiment of the present specification, the polyvinyl alcohol-based film preferably has, although not limited thereto, a degree of polymerization of greater than or equal to 1,000 and less than or equal to 10,000, and preferably greater than or equal to 1,500 and less than or equal to 5,000. This is due to the fact that, when the degree of polymerization satisfies the above-mentioned range, molecular movements are free, and mixing with iodine, a dichroic dye or the like is smooth.

Gluing Layer

To be attached to a display device panel or an optical film such as a retardation film in one embodiment of the present specification, the polarizing plate may further comprise a gluing layer provided on the other surface of the polarizer-facing surface of the protective layer.

Herein, the gluing layer may be formed using various gluing agents well known in the art, and the type is not particularly limited. For example, the gluing layer may be formed using a rubber-based gluing agent, an acryl-based gluing agent, a silicone-based gluing agent, an urethane-based gluing agent, a polyvinyl alcohol-based gluing agent, a polyvinyl pyrrolidone-based gluing agent, a polyacrylamide-based gluing agent, a cellulose-based gluing agent, a vinyl alkyl ether-based gluing agent and the like. Considering transparency, heat resistance and the like, using an acryl-based gluing agent is particularly preferred among these.

Meanwhile, the gluing layer may be formed using a method of coating a gluing agent on the top of the protective layer, or may also be formed using a method of attaching a gluing sheet, which is prepared by coating a gluing agent on a release sheet and then drying the result, on the top of the protective layer.

Image Display Device

One embodiment of the present specification provides an image display device comprising the polarizing plate described above.

The image display device comprises a liquid crystal panel; a first polarizing plate provided on a viewer side of the liquid crystal panel; and a second polarizing plate provided on a surface opposite to the viewer side of the liquid crystal panel, wherein any one or more of the first polarizing plate and the second polarizing plate are the polarizing plate described above.

Types of the liquid crystal panel are not particularly limited. For example, without being limited in the type, known panels comprising passive matrix-type panels such as a twisted nematic (TN)-type, a super twisted nematic (STN)-type, a ferroelectric (F)-type or a polymer dispersed (PD)-type; active matrix-type panels such as a two terminal-type or a three terminal-type; in plane switching (IPS)-type panels and vertical alignment (VA)-type panels may all be used. In addition, types of other constitutions forming a liquid crystal display device such as upper and lower substrates (ex. color filter substrate or array substrate) are not particularly limited as well, and constitutions known in the art may be employed without limit.

Composition

One embodiment of the present specification provides an adhesive composition for a polarizing plate comprising a first epoxy compound (A) comprising one or more alicyclic epoxy rings, and, with respect to 100 parts by weight of the first epoxy compound (A), a second epoxy compound (B) comprising one or more glycidyl ether groups in 110 parts by weight to 500 parts by weight and an oxetane compound (C) in 5 parts by weight to 85 parts by weight.

The adhesive composition for a polarizing plate may be coated on the polarizer and then cured to form an adhesive layer.

In one embodiment of the present specification, the method for forming an adhesive layer is not particularly limited, and methods known in the art may be used. For example, a method of coating the active energy ray-curable composition on one surface of the protective film using a coating method well known in the art such as spin coating, bar coating, roll coating, gravure coating or blade coating, and curing the result through irradiating ultraviolet rays while bonding the result to the polarizer. For example, a method of irradiating ultraviolet rays, irradiated light, using an ultraviolet irradiation device may be used.

The ultraviolet rays may have a wavelength of greater than or equal to 100 nm and less than or equal to 400 nm, and preferably greater than or equal to 320 nm and less than or equal to 400 nm.

The irradiated light may have light intensity of greater than or equal to 100 mJ/cm$^2$ and less than or equal to 1000 mJ/cm$^2$, and preferably greater than or equal to 500 mJ/cm$^2$ and less than or equal to 1000 mJ/cm$^2$.

Irradiation time of the irradiated light may be longer than or equal to 1 second and shorter than or equal to 10 minutes, and preferably longer than or equal to 2 seconds and shorter than or equal to 30 seconds. When satisfying the above-mentioned irradiation time range, excessive transfer of heat from a light source is prevented, which leads to an advantage of minimizing the occurrences of running wrinkles on the polarizer.

In one embodiment of the present specification, the first epoxy compound (A) may be included in greater than or equal to 5 parts by weight and less than or equal to 45 parts by weight, preferably in greater than or equal to 5 parts by weight and less than or equal to 40 parts by weight, and more preferably in greater than or equal to 10 parts by weight and less than or equal to 35 parts by weight with respect to a total 100 parts by weight of the adhesive composition. When satisfying the above-described numerical range, storage stability of the composition may be improved. Specifically, after preparing the composition, the rate of changes in the properties may be smaller when the composition is left unattended for one week or longer at 25° C. compared to when initially left unattended for less than one hour at 25° C. For example, small changes in the viscosity of the composition before and after being left unattended are advantages for long term storage.

In one embodiment of the present specification, the composition may have storage modulus of 700 Mpa to 1,600 Mpa, preferably 800 Mpa to 1,400 Mpa, and more preferably 900 Mpa to 1,200 Mpa at 80° C. after curing under a measurement condition of a temperature range of −30° C. to 160° C., a temperature raising rate of 5° C./min, a frequency of 1 Hz and strain of 10%.

When storage modulus of the composition after curing satisfies the above-mentioned numerical range, stress applied to the polarizer is effectively suppressed when used in a polarizing plate, which is effective in effectively suppressing crack occurrences on the polarizer caused by shrinkage or expansion of the polarizer under a high temperature or high humidity environment. In addition, adhesive strength for the polarizer is enhanced.

As a result, light leakage may be prevented when using the polarizing plate in a liquid crystal panel and the like by suppressing shrinkage and expansion of the polarizing plate at a high temperature, and adhesive strength of the adhesive layer for the protective film is excellent.

Meanwhile, storage modulus may be measured as described above.

In one embodiment of the present specification, the rate of change in the viscosity (W) represented by the following General Formula 2 may be 30% or less, 25% or less, or 20% or less.

$$W = \frac{\sqrt{(V2 - V1)^2}}{V1} \times 100(\%) \quad \text{[General Formula 2]}$$

In General Formula 2, V1 is initial viscosity when leaving the adhesive composition unattended for 100 hours at 25° C., and V2 is late viscosity (V2) when leaving the adhesive composition unattended for one week at 25° C.

When satisfying the above-mentioned numerical range, the composition viscosity does not change much even when stored for a long period of time, and therefore, the composition has an advantage of being readily used in the polarizing plate preparation after stored for a long period of time of one week or longer.

In one embodiment of the present specification, the active energy ray-curable composition preferably has viscosity of greater than or equal to 30 cPs and less than or equal to 200 cPs at 25° C., and, for example, the viscosity may be from 30 cPs to 130 cPs or less at 25° C. When the composition viscosity satisfies the above-mentioned numerical range, the adhesive layer may be formed to be thin, and excellent workability is obtained.

In one embodiment of the present specification, the active energy ray-curable composition may have initial viscosity (V1) of 35 cPs to 100 cPs or less when left unattended for 100 hours at 25° C. and relative humidity of 30% or less.

In one embodiment of the present specification, the active energy ray-curable composition may have late viscosity (V2) of 35 cPs to 100 cPs or less when left unattended for one week at 25° C. and relative humidity of 30% or less.

The viscosity is measured at room temperature (25° C.) with a No. 18 spindle using a Brookfield viscometer (manufactured by Brookfield Engineering). Herein, the amount of the composition is suitably from 6.5 mL to 10 mL, and stabilized values are measured within 5 minutes in order to avoid prolonged exposure to light.

Hereinafter, the present disclosure will be described in detail with reference to examples. However, the scope of a right of the present disclosure is not limited by these examples.

<Preparation Example: Preparation of Composition for Forming Protective Layer<

A composition was prepared by mixing, with respect to 100 parts by weight of 3,4-epoxycyclohexylmethyl-3',4'-epoxycyclohexanecarboxylate (CEL-2021P, manufactured by DAICEL CORPORATION), 54 parts by weight of diglycidyl ether (LD-204) and 74 parts by weight of 3-ethyl-3-[(3-ethyloxetan-3-yl)methoxymethyl]oxetane (TOAGOSEI ARON OXETANE OXT-221). With respect to 100 parts by weight of the composition, 3 parts by weight of IRGACURE 250 as a photoinitiator and 1 parts by weight of ESACURE ITX as a photosensitizer were mixed thereto to form a composition for forming a protective layer.

EXAMPLE AND COMPARATIVE EXAMPLE

On one surface of an elongated polarizer (thickness 23 μm, polyvinyl alcohol-based film, manufacturer: Nippon Gohsei Co., Ltd.) prepared in advance, a protective film (polyethylene terephthalate, manufactured by Toyobo Co., Ltd.) was laminated using an adhesive composition having a composition and a content described in the following Table 1 and Table 2 as a medium. On the other side of the polarizer, the composition for forming a protective layer prepared in the preparation example was coated and laminated. After that, by irradiating ultraviolet rays (irradiation condition: ultraviolet irradiation device: fusion D bulb, irradiation time: 10 seconds or shorter, light intensity: 1,000 mJ/cm$^2$) using a fusion lamp, the adhesive composition and the composition for forming a protective layer were cured. Herein, the thickness of the adhesive layer was 2 μm.

<Evaluation of Physical Properties>

Experimental Example 1: Measurement of Storage Modulus of Adhesive Layer

Storage modulus of the adhesive layer of each of the examples and the comparative examples was tested.

Specifically, an adhesive composition having the same composition as the adhesive layer of the polarizing plate of each of the examples and the comparative examples was coated between two PET release films to a thickness of 50 μm, and after curing the result by irradiating ultraviolet rays under a light intensity condition of 1000 mJ/cm$^2$ or greater, the release film was removed, and the result was cut to a size of a width of 5.3 mm and a length of 4.5 cm using a laser to prepare a final adhesive layer specimen.

After that, storage modulus was measured through a dynamic mechanical analyzer (DMA). With a measurement mode of multi-frequency-strain, the storage modulus was measured at 10% strain and 1 Hz frequency while raising a temperature up to 160° C. from −30° C. at a temperature raising rate of 5° C. per 1 minute, and the result at 80° C. was measured.

Experimental Example 2: Peel Strength Test on Protective Film and Adhesive Layer Peel strength of the adhesive layer of each of the examples and the comparative examples for the protective film was tested. Specifically, the polarizing plate of each of the examples and the comparative examples was left unattended for 2 days under a condition of a temperature of 25° C. and humidity of 50%, and then cut to a width of 20 mm and a length of 100 mm to prepare a specimen for the test. Using a texture analyzer device (TA-XT Plus of Stable Micro Systems), peel strength was measured while peeling off the protective film at a peeling rate of 300 mm/min and a peeling angle of 90 degrees.

Experimental Example 3: High Temperature Crack Growth Test on Polarizer

A test on polarizer crack growth inhibition by the adhesive layer was conducted. When preparing the polarizing plate of each of the examples and the comparative examples, artificial cracks were induced on the polarizer, and the polarizer was left unattended at a high temperature to observe growth of the cracks. Specifically, in the preparation of the polarizing plate of each of the examples and the comparative examples, artificial cracks were induced on the polarizer by scraping the polarizer with a load of 100 g before laminating the protective film on the polarizer, and the remaining preparation condition was the same when preparing the polarizing plate.

The prepared polarizing plate was cut to a width of 120 mm and a length of 100 mm, then left unattended for 100 hours to 300 hours at 80° C., and it was observed whether the cracks split due to shrinkage of the polarizer causing light leakage, and the number of light leaking cracks (C2) with respect to the initial total cracks (C1) was calculated to obtain a rate of crack occurrences in the polarizing plate. Specifically, 200 initial cracks were induced, and the number of light leaking cracks among the initial cracks was calculated.

*Rate of crack occurrences: number of light leaking cracks/number of initial total cracks×100(%)

Experimental Example 4: Measurement of Glass Transition Temperature of Adhesive Layer A glass transition temperature of the adhesive layer of each of the examples and the comparative examples was tested.

Specifically, an adhesive composition having the same composition as the adhesive layer of the polarizing plate of each of the examples and the comparative examples was coated between two PET release films to a thickness of 2 μm to 3 μm, and after curing the result by irradiating ultraviolet rays under a light intensity condition of 1000 mJ/cm$^2$ or greater, the release film was removed to prepare an adhesive layer specimen. After that, the prepared specimen was weighed to approximately 1 mg to 10 mg in an open cell made of aluminum, and a reversing heat flow (non-thermal component) behavior of the composition was obtained at a temperature raising rate of 10° C./min under the nitrogen atmosphere of 50 ml/min using a temperature-modulated DSC. The temperature at a point where a straight line that is in an equidistance in a longitudinal axis from a line extending a base line on a low temperature side and a base line on a high temperature side of the reversing heat flow and a curve of a stair-shaped change portion of glass transition intersect was employed as the glass transition temperature (Tg).

Experimental Example 5: Measurement of Rate of Change in Viscosity of Adhesive Composition For an adhesive composition having the same composition as the adhesive layer of each of the examples and the comparative examples, the rate of change in the viscosity was measured. The viscosity was measured at room temperature (25° C.) with a No. 18 spindle using a Brookfield viscometer (manufactured by Brookfield Engineering). Herein, the amount of the composition was suitably from 6.5 mL to 10 mL, and stabilized values were measured within 5 minutes in order to avoid prolonged exposure to light.

Viscosity measured when leaving the adhesive composition unattended for 100 hours at 25° C. was employed as initial viscosity (V1), and viscosity measured when leaving the adhesive composition unattended for one week at 25° C. was employed as late viscosity (V2), and the rate of change in the viscosity (W) herein was calculated as a rate of change in the viscosity (%) using the following General Formula 2.

[General Formula 2]

$$W = \frac{\sqrt{(V2-V1)^2}}{V1} \times 100(\%) \qquad \text{[General Formula 2]}$$

TABLE 1

| Category | | Constitution/Content | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Polarizing Plate | Adhesive Composition Constitution | (A) | 100 | 100 | 100 | 100 | 100 | 100 | 100 | 100 | 100 | 100 |
| | | (B) | 200 | 174 | 142 | 100 | 100 | 100 | 100 | 100 | 100 | 100 |
| | | (C1) | 53 | 48 | 48 | 22 | 35 | 50 | 86 | 133 | 200 | 800 |
| | | (C2) | 0 | 0 | 0 | 0 | 0 | 0 | 0 | 0 | 0 | 0 |
| | | (D) | 0 | 0 | 32 | 0 | 0 | 0 | 0 | 0 | 0 | 0 |
| | | (E) | 3 | 3 | 3 | 3 | 3 | 3 | 3 | 3 | 3 | 3 |
| | | (F) | 1 | 1 | 1 | 1 | 1 | 1 | 1 | 1 | 1 | 1 |
| Evaluation on Properties | Experimental Example 1 | Adhesive Layer Storage Modulus (Mpa) | 1,178 | 1,059 | 1,023 | 1,340 | 1,273 | 1,346 | 1,274 | 1,225 | 1,507 | 986 |
| | Experimental Example 2 | Peel Strength (N/cm) | 6.3 | 4.3 | 5 | 2.3 | 3.1 | 3 | 1.9 | 2.3 | 0.3 | 0.8 |
| | Experimental Example 3 | Rate of Crack Occurrences (%) | 10 | 0 | 0 | 0 | 0 | 0 | 28 | 52 | 100 | 100 |
| | Experimental Example 4 | Adhesive Layer Tg (°C.) | 115 | 116 | 118 | 118 | 120 | 120 | 124 | 127 | 126 | 83 |
| | Experimental Example 5 | Initial Viscosity (cPs) | 72 | 78 | 48 | 156 | 102 | 98 | 83 | 60 | 39 | 21 |
| | | Late Viscosity (cPs) | 90 | 90 | 48 | 150 | 100 | 115 | 160 | 186 | Gel | Gel |
| | | Rate of Change in Viscosity (%) | 25 | 15.4 | 0 | 3.8 | 2.0 | 17.3 | 92.8 | 210 | — | — |

(A) first epoxy compound (3,4-epoxycyclohexylmethyl-3',4'-epoxycyclohexanecarboxylate, product name: CEL-2021P
(B) second epoxy compound (diglycidyl ether (CHDMDGDE), product name: LD-204)
(C1) oxetane compound (3-ethyl-3-[(3-ethyloxetan-3-yl)methoxymethyl]oxetane, product name: OXT-221)
(C2) oxetane compound (3-ethyl-3-[(2-ethylhexyl)methyloxetane, product name: OXT-212]
(D) acryl-based monomer (1,9-nonanediol diacrylate)
(E) photoinitiator (IRGACURE 250)
(F) photosensitizer (ESACURE ITX)
Numerical values of (A) to (F) represent a weight ratio of each component
Numerical values of (A) to (D) mean a weight ratio of each component with respect to 100 parts by weight of (A) component
Numerical values of (E) and (F) mean a weight ratio of each component with respect to a total weight of (A) to (D)
'Gel' in Experimental Example 5 means that viscosity measurement was difficult since the composition changed to a gel state

TABLE 2

| Category | | Constitution/Content | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|---|---|
| Polarizing Plate | Adhesive Composition Type and Content | (A) | 100 | 100 | 100 | 100 | 100 | 100 | 100 | 100 | 100 | 100 |
| | | (B) | 50 | 33 | 0 | 0 | 0 | 0 | 0 | 0 | 0 | 57 |
| | | (C1) | 26 | 23 | 11 | 18 | 25 | 43 | 67 | 100 | 400 | 17 |
| | | (C2) | 0 | 0 | 0 | 0 | 0 | 0 | 0 | 0 | 0 | 111 |
| | | (D) | 0 | 0 | 0 | 0 | 0 | 0 | 0 | 0 | 0 | 0 |
| | | (E) | 3 | 3 | 3 | 3 | 3 | 3 | 3 | 3 | 3 | 3 |
| | | (F) | 1 | 1 | 1 | 1 | 1 | 1 | 1 | 1 | 1 | 1 |
| Evaluation | Experimental | Adhesive Layer | 1,989 | 1,908 | 2,011 | 2,095 | 2,012 | 1,963 | 1,675 | 1,687 | 1,243 | 100 |

TABLE 2-continued

| Category | | Constitution/Content | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|---|---|
| Properties | Example 1 | Storage Modulus (Mpa) | | | | | | | | | | |
| | Experimental Example 2 | Peel Strength (N/cm) | 0.8 | 0.1 | 0.1 | 0.1 | 0.1 | 0.6 | 0.8 | 1.8 | 1.3 | 8.5 |
| | Experimental Example 3 | Rate of Crack Occurrences (%) | 0 | 0 | 0 | 0 | 0 | 15 | 48 | 80 | 100 | 100 |
| | Experimental Example 4 | Adhesive Layer Tg (° C.) | 130 | 130 | 142 | 128 | 126 | 133 | 130 | 137 | 125 | 70 |
| | Experimental Example 5 | Initial Viscosity (cPs) | 101 | 128 | 180 | 118 | 110 | 92 | 68 | 42 | 23 | 31 |
| | | Late Viscosity (cPs) | 116 | 135 | 230 | 213 | 200 | 185 | 200 | 450 | Gel | 32 |
| | | Rate of Change in Viscosity (%) | 14.9 | 5.5 | 28 | 80.5 | 81.8 | 101 | 194 | 971.4 | — | 32 |

* descriptions are the same as Table 1

From the above-described results, it was identified that peel strength for the protective film significantly decreased when the adhesive composition did not comprise the second epoxy compound comprising one or more glycidyl ether groups, or included the second epoxy compound in less than 110 parts by weight with respect to 100 parts by weight of the first epoxy compound (Comparative Example 1 to Comparative Example 17). In addition, it was identified that a number of polarizer cracks of Experimental Example 2 occurred when the adhesive composition included the oxetane compound in greater than 85 parts by weight with respect to 100 parts by weight of the first epoxy compound since the adhesive layer was not able to sufficiently protect the polarizer (Comparative Example 4 to Comparative Example 7).

In summary, when adjusting a content of each of the components included in the polarizing plate adhesive layer to a specific range, peel strength for the protective film is excellent and the polarizer may be sufficiently protected, and in addition thereto, performance as an adhesive layer may be enhanced by maintaining storage modulus at a certain level or lower. Meanwhile, it was identified that the adhesive composition having the components included in the polarizing plate adhesive layer in the range of the present specification was advantageous for long term storage since viscosity did not excessively increase when stored for a long period of time.

REFERENCE NUMERAL

10: Polarizer
20: Protective Layer
30: Protective Film
40: Gluing Layer
50: Adhesive Layer
100: Polarizing Plate
200: Liquid Crystal Panel

The invention claimed is:

1. A polarizing plate, comprising:
a polarizer;
a protective layer directly formed on one surface of the polarizer; and
an adhesive layer and a protective film consecutively provided on a surface of the polarizer on which the protective layer is not formed,
wherein the protective film is a polyethylene terephthalate (PET) film, a cycloolefin polymer (COP) film, or an acryl-based film,
wherein the adhesive layer is a resin layer comprising an active energy ray-curable composition comprising a first epoxy compound (A) comprising one or more alicyclic epoxy rings, and, with respect to 100 parts by weight of the first epoxy compound (A), a second epoxy compound (B) comprising one or more glycidyl ether groups in 140 parts by weight to 500 parts by weight and an oxetane compound (C) in 5 parts by weight to 85 parts by weight, or a cured material thereof, and
wherein a peel strength of the adhesive layer satisfies the following General Formula 1, $$P \geq 3.5 \text{ N/cm} \quad \text{[General Formula 1]}$$

in General Formula 1, P is the peel strength of the adhesive layer and is measured by peeling the protective film from the adhesive layer at 25° C. at a peeling angle of 90° and a peeling rate of 300 mm/min.

2. The polarizing plate of claim 1, wherein the adhesive layer has storage modulus of 700 Mpa to 1,600 Mpa at 80° C. under a measurement condition of a temperature range of −30° C. to 160° C., a temperature raising rate of 5° C./min, a frequency of 1 Hz and strain of 10%.

3. The polarizing plate of claim 1, wherein, as a result of a high temperature crack growth test on the polarizer, a ratio of the number of light leaking cracks (C2) with respect to the number of total cracks (C1) is 20% or less.

4. The polarizing plate of claim 1, wherein the adhesive layer has a glass transition temperature of 90° C. or higher.

5. The polarizing plate of claim 1, wherein the adhesive layer has a thermal expansion coefficient of 130 ppm/K or less at 80° C.

6. The polarizing plate of claim 1, wherein the adhesive layer has a thickness of greater than or equal to 0.5 μm and less than or equal to 8 μm.

7. The polarizing plate of claim 1, wherein the protective layer has a thickness of greater than or equal to 4 μm and less than or equal to 11 μm.

8. The polarizing plate of claim 1, which does not further comprise a protective film on the other surface of the polarizer-facing surface of the protective layer.

9. The polarizing plate of claim 1, further comprising a gluing layer on the other surface of the polarizer-facing surface of the protective layer.

10. An image display device comprising the polarizing plate of claim 1.

11. An adhesive composition for a polarizing plate comprising:
   a first epoxy compound (A) comprising one or more alicyclic epoxy rings; and, with respect to 100 parts by weight of the first epoxy compound (A),
   a second epoxy compound (B) comprising one or more glycidyl ether groups in 140 parts by weight to 500 parts by weight; and
   an oxetane compound (C) in 5 parts by weight to 85 parts by weight,
   wherein the adhesive composition has a rate of change in the viscosity (W) of 30% or less, wherein the rate of change in the viscosity (W) is represented by the following General Formula 2:

$$W = \frac{\sqrt{(V2-V1)^2}}{V1} \times 100 (\%) \qquad \text{[General Formula 2]}$$

in General Formula 2, V1 is initial viscosity measure after leaving the adhesive composition unattended for 100 hours at 25° C., and V2 is late viscosity (V2) measured after leaving the adhesive composition unattended for one week at 25° C.

12. The adhesive composition for a polarizing plate of claim 11, comprising the first epoxy compound (A) in greater than or equal to 5 parts by weight and less than or equal to 45 parts by weight with respect to a total 100 parts by weight of the adhesive composition.

13. The adhesive composition for a polarizing plate of claim 11, which has storage modulus of 700 Mpa to 1,600 Mpa at 80° C. after curing under a measurement condition of a temperature range of −30° C. to 160° C., a temperature raising rate of 5° C./min, a frequency of 1 Hz and strain of 10%.

* * * * *